United States Patent
Ahn et al.

(10) Patent No.: US 12,449,655 B2
(45) Date of Patent: Oct. 21, 2025

(54) HEAD-UP DISPLAY

(71) Applicant: LG ELECTRONICS INC., Seoul (KR)

(72) Inventors: Jisun Ahn, Seoul (KR); Dongwook Kim, Seoul (KR); Kwangwoo Kim, Seoul (KR); Seungsik Koh, Seoul (KR); Seonho Lee, Seoul (KR); Bosun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/577,865

(22) PCT Filed: Dec. 8, 2022

(86) PCT No.: PCT/KR2022/019887
§ 371 (c)(1),
(2) Date: Jan. 9, 2024

(87) PCT Pub. No.: WO2024/122683
PCT Pub. Date: Jun. 13, 2024

(65) Prior Publication Data
US 2024/0264438 A1    Aug. 8, 2024

(51) Int. Cl.
*G02B 27/01*    (2006.01)

(52) U.S. Cl.
CPC ................ *G02B 27/0101* (2013.01)

(58) Field of Classification Search
CPC .... G02B 2027/0105–0198; G02B 27/01–0189
See application file for complete search history.

(56) References Cited

U.S. PATENT DOCUMENTS

| | | | |
|---|---|---|---|
| 11,169,377 B1 * | 11/2021 | Chen | G02B 27/0101 |
| 2013/0265646 A1 | 10/2013 | Sakai | |
| 2015/0061976 A1 | 3/2015 | Ferri | |
| 2017/0139206 A1 | 5/2017 | Sugikawa | |

(Continued)

FOREIGN PATENT DOCUMENTS

| | | |
|---|---|---|
| CN | 113970845 | 1/2022 |
| JP | 2013-214008 | 10/2013 |

(Continued)

OTHER PUBLICATIONS

Korean Intellectual Property Office Application No. 10-2023-7042348, Office Action dated Sep. 20, 2024, 4 pages.

(Continued)

*Primary Examiner* — Christopher A Lamb, II
(74) *Attorney, Agent, or Firm* — LEE, HONG, DEGERMAN, KANG & WAIMEY

(57) ABSTRACT

A head-up display may comprise: a picture generation unit having an emission surface from which image light is emitted; a half-wavelength phase retarder disposed to face a first area of the emission surface; a first flat mirror configured to reflect image light emitted from a second area of the emission surface; a second flat mirror configured to reflect image light emitted from the half-wavelength phase retarder; and a concave mirror configured to reflect each of the image light reflected by the first flat mirror and the image light reflected by the second flat mirror to a window shield.

5 Claims, 4 Drawing Sheets

(56) References Cited

U.S. PATENT DOCUMENTS

| | | |
|---|---|---|
| 2018/0314065 A1 | 11/2018 | Li |
| 2019/0049725 A1 | 2/2019 | Kondo et al. |
| 2020/0012099 A1 | 1/2020 | Kim et al. |
| 2020/0026075 A1* | 1/2020 | Kim .................. G02B 27/286 |
| 2020/0201054 A1* | 6/2020 | Masuya ............. G02B 27/0179 |
| 2021/0271078 A1* | 9/2021 | Watanabe .......... G02B 27/0101 |

FOREIGN PATENT DOCUMENTS

| | | |
|---|---|---|
| JP | 2017-090822 | 5/2017 |
| JP | 2020-144306 | 9/2020 |
| KR | 10-2017-0132067 | 12/2017 |
| KR | 10-2017-0136807 | 12/2017 |
| KR | 10-1882082 | 7/2018 |
| KR | 10-2018-0097339 | 8/2018 |
| KR | 10-1909374 | 10/2018 |
| KR | 10-2021-0026169 | 3/2021 |
| WO | 2022-025329 | 2/2022 |

OTHER PUBLICATIONS

Korean Intellectual Property Office Application No. 10-2023-7042348, Office Action dated Apr. 5, 2024, 4 pages.
PCT International Application No. PCT/KR2022/019887, International Search Report dated Sep. 1, 2023, 3 pages.
European Patent Office Application Serial No. 22967941.0, Search Report dated Feb. 17, 2025, 6 pages.

* cited by examiner

[FIG. 1]
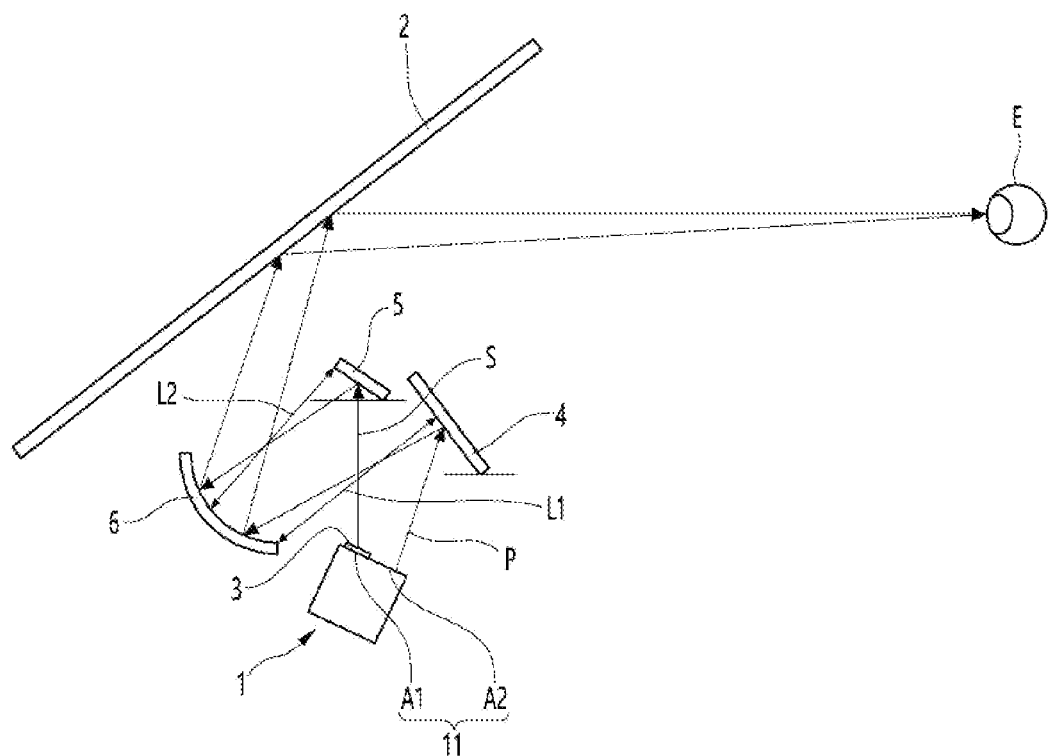

[FIG.2]
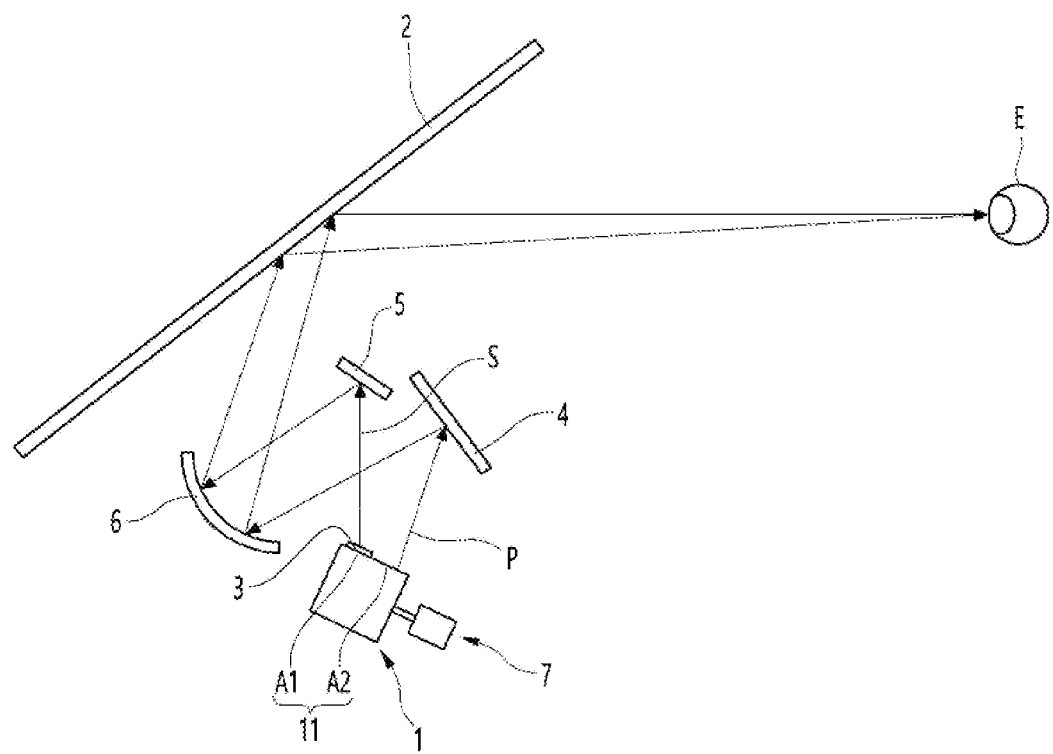

[FIG.3]
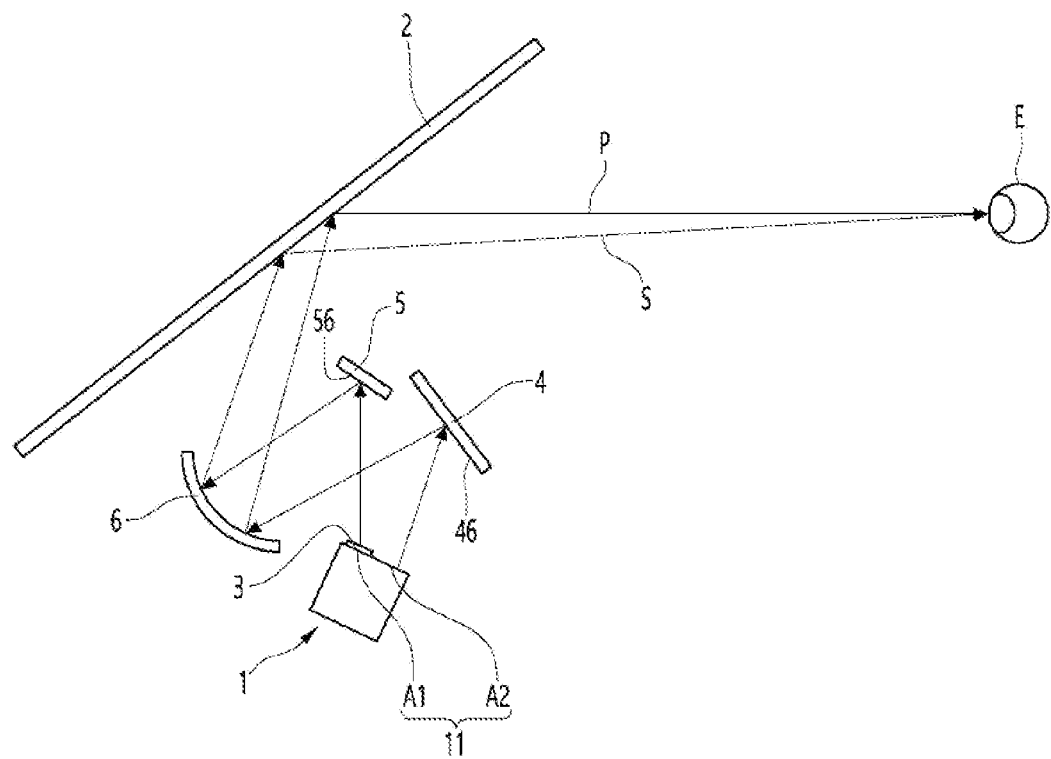

[FIG.4]
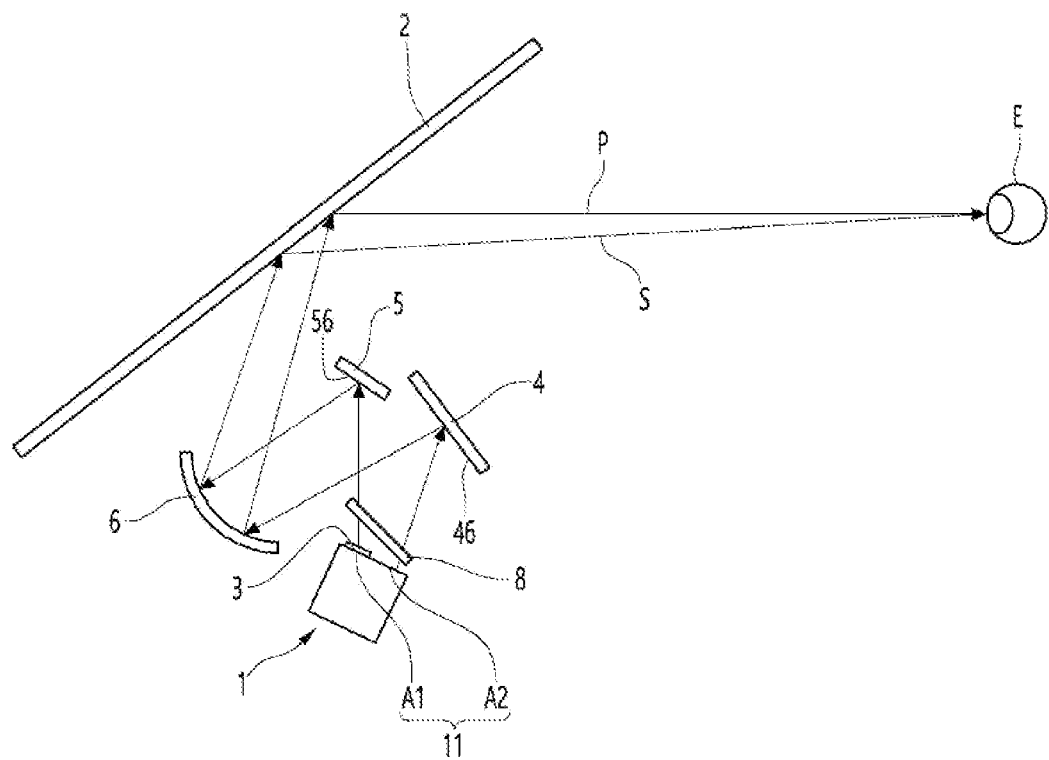

HEAD-UP DISPLAY

CROSS-REFERENCE TO RELATED APPLICATION(S)

This application is the National Stage filing under 35 U.S.C. 371 of International Application No. PCT/KR2022/019887, filed on Dec. 8, 2022, the contents of which is hereby incorporated by reference herein in its entirety.

TECHNICAL FIELD

The present invention relates to a head-up display capable of being installed in a vehicle.

BACKGROUND ART

A head-up display may be a device provided in a vehicle to emit image light to a windshield of the vehicle. The head-up display may display various information comprising driving information during the driving of the vehicle. The head-up display comprises a display panel generating and outputting image light and at least one mirror reflecting the image light generated by the display panel.

The image light generated by the display panel may be incident into the windshield of the vehicle by the mirror, and a driver may recognize a virtual image in the front of the windshield.

The head-up display comprises one image source, but is capable of forming two virtual images by forming two optical paths having different total lengths of the optical paths, and a head-up display for a vehicle, which forms two optical paths using one image source, is disclosed in Korean Patent Publication No. 10-1909374 B1 (announced on Oct. 17, 2018).

The head-up display for the vehicle comprises: an image source that emits linearly polarized light in a first direction; a prism that refracts some of the linearly polarized light emitted from the image source; an electric polarization conversion element that transmits others of the linearly polarized light emitted from the image source when turned off, and converts others of the linearly polarized light emitted from the image source into linearly polarized light in a second direction perpendicular to the first direction by a half-wavelength when turned on; a first reflection mirror that reflects light to a windshield of the vehicle; a polarization reflection mirror disposed to be spaced apart from the first reflection mirror, reflecting the linearly polarized light in a first direction, and transmitting the linearly polarized light in a second direction; and a second reflection mirror disposed to be spaced apart from the polarization reflection mirror and reflecting the light transmitted through the polarization reflection mirror to the polarization reflection mirror, and the second reflection mirror comprises a flat mirror disposed to face the polarization reflection mirror.

DISCLOSURE OF THE INVENTION

Technical Problem

The present embodiment provides a head-up display capable of implementing two image while minimizing noise between horizontal and vertical polarization by dividing image light generated by a picture generation unit through a simple structure.

Technical Solution

A head-up display according to the present embodiment may comprise: a picture generation unit having an emission surface from which image light is emitted; a half-wavelength phase retarder disposed to face a first area of the emission surface; a first flat mirror configured to reflect image light emitted from a second area of the emission surface; a second flat mirror configured to reflect image light emitted from the half-wavelength phase retarder; and a concave mirror configured to reflect each of the image light reflected by the first flat mirror and the image light reflected by the second flat mirror to a window shield.

The first flat mirror and the second flat mirror may be spaced apart from each other.

The first flat mirror and the second flat mirror may be inclined at angles different from each other, respectively.

The head-up display may further comprise a tilting mechanism configured to tilt an angle of the picture generation unit.

A cold mirror coating may be provided, or a cold mirror film may be attached on each of the first flat mirror and the second flat mirror.

The head-up display may further comprise a polarizer glass through which image light directed toward the first flat mirror and image light directed toward the second flat mirror are transmitted.

The polarizer glass may be disposed to face the half-wavelength phase retarder and the second area.

Advantageous Effects

According to the present embodiment, the image light emitted from the picture generation unit may be divided into the horizontal polarization and the vertical polarization through the simple structures of the half-wave phase retarder, the first flat mirror, and the second flat mirror, and the head-up display may be minimized in volume.

In addition, the two images may be implemented while minimizing the noise between the horizontal and the vertical polarization.

In addition, the tilting mechanism may tilt the picture generation unit to minimize the internal reflection caused by the sunlight.

In addition, since each of the first and second flat mirrors is provided as the cold mirror, the deterioration of the components due to the sunlight may be minimized.

BRIEF DESCRIPTION OF THE DRAWINGS

FIG. 1 is a side view illustrating an example of a head-up display according to the present embodiment, FIG. 2 is a side view illustrating another example of the head-up display according to the present embodiment, FIG. 3 is a side view illustrating a first modified example of the head-up display according to this embodiment, and FIG. 4 is a side view illustrating a second modified example of the head-up display according to this embodiment.

MODE FOR CARRYING OUT THE INVENTION

Hereinafter, detailed embodiments will be described in detail with reference to the accompanying drawings.

FIG. 1 is a side view illustrating an example of a head-up display according to the present embodiment.

An example of a head-up display may comprise a picture generation unit 1 (PGU) having an emission surface 11 through which image light is emitted. The picture generation unit 1 may comprise a light source such as an LED and a display panel such as an LCD. The picture generation unit 1 may comprise at least one lens disposed between the light source and the display panel.

In the picture generation unit 1, the display panel or a plurality of lenses may comprise a polarizing plate or a polarizing sheet, and the picture generation unit 1 may emit a polarized image having a P-wave or an S-wave.

The picture generation unit 1 may comprise an emission surface 11 through which image light is emitted, and the emission surface 11 may comprise a first area A1 and a second area A2.

The first area A1 and the second area A2 may be different areas, and the image light may be emitted through each of the first area A1 and the second area A2.

An example of the head-up display may form a virtual image in front of a windshield 2, and a driver E (eye box) may recognize the virtual image formed in front of the windshield 2.

The windshield 2 may be a windshield of the vehicle, and the driver (eye box) may recognize the virtual image formed in front of the windshield 2 through the windshield 2.

An example of the head-up display may further comprise a half-wave phase retarder 3 (HWP).

The half-wave phase retarder 3 may be disposed to face the first area A1 of the emission surface 11.

The half-wave phase retarder 3 may be a phase retarder that converts a phase of the image light emitted from the first area A1 by a half-wavelength.

As the half-wave phase retarder 3 may convert the phase of the image light emitted from the first area A1 and may not convert the phase of the image light emitted from the second area A2, the picture generation unit 1 and the half-wave phase retarder 3 may divide the image light into horizontal polarization and vertical polarization.

For example, when the image light emitted from the picture generation unit 1 has the P-wave, the S-wave image light may be emitted from the half-wavelength phase retarder 3. When the image light emitted from the picture generation unit 1 is the S-wave, the P-wave image light may be emitted from the half-wavelength phase retarder 3.

The half-wave phase retarder 3 may be disposed on the emission surface 11 of the picture generation unit 1 or may be disposed close to the emission surface 11 of the picture generation unit 1.

An example of the head-up display may comprise a pair of flat mirrors 4 and 5, and the pair of flat mirrors 4 and 5 may comprise a first flat mirror 4 and a second flat mirror 5.

The first flat mirror 4 and the second flat mirror 5 may be spaced apart from each other.

The first flat mirror 4 may comprise an overlap area that overlaps the second flat mirror 5 in a front and rear direction. The first flat mirror 4 may be spaced apart from the second flat mirror 5 in the front and rear direction.

The first flat mirror 4 may reflect the image light emitted from the second area A2 of the emission surface 11.

The second flat mirror 5 may reflect the image light emitted from the half-wavelength phase retarder 2.

Each of the first flat mirror 4 and the second flat mirror 5 may be disposed at an angle.

The first flat mirror 4 and the second flat mirror 5 may be inclined at different angles. One of the first flat mirror 4 and the second flat mirror 5 may be disposed more gently than the other. The second flat mirror 5 may be gently disposed closer to a horizontal plane than the first flat mirror 4.

The first angle between the first flat mirror 4 and the horizontal plane may be greater than the second angle between the second flat mirror 5 and the horizontal plane.

The first flat mirror 4 and the second flat mirror 5 may reflect image light having different wavelengths.

For example, when the image light emitted from the picture generation unit 1 is the P-wave, the first flat mirror 4 may reflect the P-wave image light, and the second flat mirror 5 may reflect the S-wave image light.

Both the P-wave image light reflected from the first flat mirror 4 and the S-wave image light reflected from the second flat mirror 5 may be directed to a concave mirror 6.

The concave mirror 6 may reflect each of the image light (e.g., the P-wave) reflected from the first flat mirror 4 and the image light (e.g., the S-wave) reflected from the second flat mirror 5 to a windshield 2.

Since the image light (e.g., the P-wave) reflected from the first flat mirror 4 and the image light (e.g., the S-wave) reflected from the second flat mirror 5 have different wavelengths, noise between the image light may be minimized, and two light (e.g., the P-wave and the S-wave) may not interfere with each other.

The first flat mirror 4 and the second flat mirror 5 may have different distances from the concave mirror 6. That is, a first distance L1 between the first flat mirror 4 and the concave mirror 6 may be different from a second distance L2 between the second flat mirror 5 and the concave mirror 6.

The first distance L1 may be the shortest distance between the first flat mirror 4 and the concave mirror 6, and the second distance L2 may be the shortest distance between the second flat mirror 5 and the concave mirror 6.

The second distance L2 may be shorter than the first distance L1.

An example of the head-up display may comprise a first optical path, through which the picture generation unit 1, the first flat mirror 4, the concave mirror 6, and the windshield 2 are connected to each other, and a second optical path, through which the picture generation unit 1, the second flat mirror 5, the concave mirror 6, and the windshield 2 are connected to each other.

A total length of the first optical path may be longer than a total length of the second optical path.

Two virtual images having different distances may be formed in front of the windshield 2, and the driver (eye box) may recognize the two virtual images in front of the windshield 2.

FIG. 2 is a side view illustrating another example of the head-up display according to the present embodiment.

As illustrated in FIG. 2, another example of the head-up display may comprise a picture generation unit 1, a half-wave phase retarder 3, a first flat mirror 4, a second flat mirror 5, and a concave mirror, and may further comprise a tilting mechanism 7.

The picture generation unit 1, the half-wave phase retarder 3, the first flat mirror 4, the second flat mirror 5, and the concave mirror 6 may be the same or similar to those of an example of the head-up display illustrated in FIG. 1, and to avoid duplicated description, the same symbols are used, and the description thereof will be omitted.

The tilting mechanism 7 may tilt an angle of the picture generation unit 1. The tilting mechanism 7 may comprise a driving source such as a motor or cylinder connected to the picture generation unit 1.

The tilting mechanism 7 may allow the picture generation unit 1 to rotate about a horizontal axis, and an emission surface 11 of the picture generation unit 1 may be tilted close to a horizontal plane or tilted close to a vertical plane.

The placement angle of the emission surface 11 of the picture generation unit 1 may be changed as the picture generation unit 1 is tilted, and internal reflection (back-reflection) due to sunlight may be minimized.

FIG. 3 is a side view illustrating a first modified example of the head-up display according to this embodiment.

As illustrated in FIG. 3, a first modified example of the head-up display may comprise a picture generation unit 1, a half-wave phase retarder 3, a first flat mirror 4, a second flat mirror 5, and a concave mirror 6, and cold mirror coatings 46 and 56 may be disposed, or a cold mirror film may be attached to each of the first flat mirror 4 and the second flat mirror 5. Each of the first mirror 4 and the second mirror 4 may be the cold mirror.

The picture generation unit 1, the half-wave phase retarder 3, the first flat mirror 4, the second flat mirror 5, and the concave mirror 6 may be the same or similar to those of an example of the head-up display illustrated in FIG. 1, and to avoid duplicated description, the same symbols are used, and the description thereof will be omitted.

The first flat mirror 4 may be a first cold mirror, on which the cold mirror coatings 46 and 56 are disposed on an outer surface, or the cold mirror film is disposed, and may transmit visible and infrared rays and maximize reflection of ultraviolet rays to minimize damage due to heat.

The second flat mirror 5 may be a second cold mirror, on which the cold mirror coatings 46 and 56 are disposed on an outer surface, or the cold mirror film is disposed, and may transmit visible and infrared rays and maximize reflection of ultraviolet rays to minimize damage due to heat.

In the first modified example, since each of the first mirror 4 and the second mirror 5 is provided as the cold mirror, mirror deterioration due to the sunlight may be minimized.

FIG. 4 is a side view illustrating a second modified example of the head-up display according to this embodiment.

As illustrated in FIG. 4, a second modified example of the head-up display may comprise a picture generation unit 1, a half-wave phase retarder 3, a first flat mirror 4, a second flat mirror 5, and a concave mirror, and may further comprise a polarizer glass 8.

The picture generation unit 1, the half-wave phase retarder 3, the first flat mirror 4, the second flat mirror 5, and the concave mirror 6 may be the same or similar to those of an example of the head-up display illustrated in FIG. 1, and to avoid duplicated description, the same symbols are used, and the description thereof will be omitted.

Image light directed toward the first flat mirror 4 and image light directed toward the second flat mirror 5 may pass through the polarizer glass 8.

The polarizer glass 8 may be disposed between the picture generation unit 1 and the first flat mirror 4 and may be disposed between the picture generation unit 1 and the second flat mirror 5.

The polarizer glass 8 may be disposed to face the half-wave phase retarder 3 and a second area A2.

In the second modification, each of the first flat mirror 4 and the second flat mirror 5 may be provided as a cold mirror, and the polarizer glass 8 may be further provided between the picture generation unit 1 and the first flat mirror 4 and between the device 1 and the second flat mirror 5 to minimize deterioration of the components due to sunlight.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being comprised in the present invention.

What is claimed is:

1. A head-up display comprising:
   a picture generation unit having an emission surface from which image light is emitted;
   a half-wavelength phase retarder disposed to face a first area of the emission surface;
   a first flat mirror configured to reflect image light emitted from a second area of the emission surface;
   a second flat mirror configured to reflect image light emitted from the half-wavelength phase retarder;
   a concave mirror configured to reflect each of the image light reflected by the first flat mirror and the image light reflected by the second flat mirror to a window shield;
   a tilting mechanism connected to the picture generation unit and configured to tilt an angle of the picture generation unit; and
   a polarizer glass through which image light directed toward the first flat mirror and image light directed toward the second flat mirror are transmitted;
   wherein the half-wavelength phase retarder is disposed on the emission surface of the picture generation unit,
   wherein one surface of the polarizer glass faces the half-wavelength phase retarder and the second area of the emission surface,
   wherein the polarizer glass is disposed between the half-wavelength phase retarder and the second flat mirror and between the second area and the first flat mirror.

2. The head-up display according to claim 1, wherein the first flat mirror and the second flat mirror are spaced apart from each other.

3. The head-up display according to claim 1, wherein the first flat mirror and the second flat mirror are inclined at angles different from each other, respectively.

4. The head-up display according to claim 1, wherein a cold mirror coating is provided, or a cold mirror film is attached on each of the first flat mirror and the second flat mirror.

5. The head-up display according to claim 1, wherein the first flat mirror comprises an overlap area that overlaps the second flat mirror in a front and rear direction.

* * * * *